(12) United States Patent
Kim et al.

(10) Patent No.: US 8,879,009 B2
(45) Date of Patent: Nov. 4, 2014

(54) OPTICAL FILTER FOR A STEREOSCOPIC DISPLAY DEVICE COMPRISING ONE OR MORE ALIGNMENT LAYERS EACH HAVING PARTITION WALL PARTS WITH HEIGHT GREATER THAN THAT OF CENTER PART AND STEREOSCOPIC DISPLAY DEVICE COMPRISING THE SAME

(75) Inventors: Hyun-Sik Kim, Daejeon (KR); Jung-Ho Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/884,860

(22) PCT Filed: Nov. 10, 2011

(86) PCT No.: PCT/KR2011/008558
§ 371 (c)(1),
(2), (4) Date: May 10, 2013

(87) PCT Pub. No.: WO2012/064124
PCT Pub. Date: May 18, 2012

(65) Prior Publication Data
US 2013/0222721 A1 Aug. 29, 2013

(30) Foreign Application Priority Data

Nov. 11, 2010 (KR) .................. 10-2010-0111853
Oct. 14, 2011 (KR) .................. 10-2011-0105504

(51) Int. Cl.
*G02F 1/1337* (2006.01)
*G02B 27/22* (2006.01)
*G02B 5/20* (2006.01)
*G02B 27/26* (2006.01)

(52) U.S. Cl.
CPC ............. *G02B 27/22* (2013.01); *G02B 5/201* (2013.01); *G02B 27/2214* (2013.01); *G02B 27/26* (2013.01)
USPC ............. 349/15; 349/123; 349/134; 349/135

(58) Field of Classification Search
CPC .................. G02F 1/133753; G02F 1/133377; G02F 1/1337
USPC .................................... 349/15, 123, 134, 135
See application file for complete search history.

(56) References Cited

U.S. PATENT DOCUMENTS

| | | | |
|---|---|---|---|
| 7,705,943 B2* | 4/2010 | Kume et al. | 349/130 |
| 8,094,271 B2 | 1/2012 | Aiki et al. | |
| 8,179,514 B2* | 5/2012 | Kurozumi et al. | 349/155 |
| 2006/0160970 A1 | 7/2006 | Kim et al. | |
| 2006/0176430 A1* | 8/2006 | Sasaki et al. | 349/123 |
| 2007/0064193 A1* | 3/2007 | Kurasawa | 349/155 |
| 2007/0077502 A1 | 4/2007 | Moriya | |
| 2009/0141214 A1* | 6/2009 | Suzuki et al. | 349/75 |
| 2009/0190213 A1 | 7/2009 | Tamura et al. | |
| 2010/0068419 A1 | 3/2010 | Kim et al. | |
| 2010/0073604 A1 | 3/2010 | Okuyama et al. | |

FOREIGN PATENT DOCUMENTS

| | | |
|---|---|---|
| CN | 101861535 A | 10/2010 |
| JP | 2006-084510 A | 3/2006 |
| JP | 2007-101645 A | 4/2007 |
| JP | 2007-163722 A | 6/2007 |
| JP | 2007-233376 A | 9/2007 |
| JP | 2007-279448 A | 10/2007 |
| JP | 2008-12388 A | 1/2008 |
| JP | 2008-527103 A | 7/2008 |
| JP | 2009-75239 A | 4/2009 |
| JP | 2009-75256 A | 4/2009 |
| JP | 2009-175551 A | 8/2009 |
| JP | 2010-507831 A | 3/2010 |
| JP | 2010-169951 A | 8/2010 |
| KR | 1020020091703 A | 12/2002 |
| KR | 2005-0000013 A | 1/2005 |
| KR | 1020060015169 A | 2/2006 |

* cited by examiner

*Primary Examiner* — Huyen Ngo
(74) *Attorney, Agent, or Firm* — Mckenna Long & Aldridge LLP

(57) ABSTRACT

An optical filter for a stereoscopic display device separating left-view and right-view images includes a substrate, one or more alignment layers formed on the substrate in a predetermined pattern and each having partition wall parts on edges of each alignment layer, and one or more liquid crystal layers formed on the alignment layers, wherein a height of each of the partition wall parts is two to ten times greater than a thickness of a center part of each alignment layer.

14 Claims, 8 Drawing Sheets

OPTICAL FILTER FOR A STEREOSCOPIC DISPLAY DEVICE COMPRISING ONE OR MORE ALIGNMENT LAYERS EACH HAVING PARTITION WALL PARTS WITH HEIGHT GREATER THAN THAT OF CENTER PART AND STEREOSCOPIC DISPLAY DEVICE COMPRISING THE SAME

This application is a National Stage application of PCT/KR2011/008558, filed Nov. 10, 2011, which claims priority to and the benefit of Korean Patent Application Nos. 10-2010-0111853, filed Nov. 11, 2010 and 10-2011-0105504, filed Oct. 14, 2011, the entire contents of which are incorporated herein by reference.

TECHNICAL FIELD

The present invention relates to an optical filter and a stereoscopic display device including the same, and more particularly, to an optical filter of which patterned line width and liquid crystal layer thickness are easily adjustable, and of which optical characteristics are excellent due to prevention of mixing between liquid crystal layers, and a stereoscopic display device including the same.

BACKGROUND ART

A stereoscopic display device produces a three-dimensional image, similar to an actual object, as seen by a human being, by providing different images to the left and right eyes. In general, a human being perceives three-dimensional objects because the left and right eyes asynchronously recognize objects. That is, because the eyes of human beings are spaced apart by about 65 mm, an object is viewed on different angles by respective eyes, causing binocular parallax. Due to the phenomenon of binocular parallax, objects are perceived three-dimensionally. Therefore, by providing the eyes of an observer with images apparently seen on different angles, three-dimensional images may be realized.

A typical stereoscopic display device may be classified into a glasses type stereoscopic display device and a glasses-free type stereoscopic display device. According to the glasses type stereoscopic display device, a left-view image and a right-view image having different polarization characteristics are outputted from a display device, the left-view image and the right-view image being projected to respective left-eye and right-eye lenses of glasses to which polarizing plates having different transmission axes are attached, to thereby allow a user to perceive objects three-dimensionally. Although the inconvenience of wearing glasses exists with regard to the glasses type stereoscopic display device, limitations on viewing angles are relatively small, and fabrication is relatively easy.

In general, the glasses type stereoscopic display device includes a display panel for generating a left-view image and a right-view image, and a polarization separating unit attached to the display panel for imparting different polarization states to the left-view and right-view images.

The polarization separating unit is manufactured by directly patterning a polarizing plate itself, or by attaching a retardation plate (optical filter), patterned to correspond to left-view and right-view images, to the polarizing plate.

According to the method of patterning the polarizing plate itself, because a chemical etching process should be performed, a manufacturing process may be complicated and a production costs are high. Therefore, recently, the method of attaching a patterned retardation plate (optical filter) to the polarizing plate has been widely used. For patterning the retardation plate, a method of partially eliminating a retardation layer using laser etching after forming the retardation layer on a substrate, or a method of selectively printing an alignment layer and a liquid crystal layer on a substrate using a roll printing technique is used. However, according to the laser etching technique, the retardation layer may be easily damaged or deformed due to heat, thereby increasing a defect ratio. According to the roll printing technique, an optical filter may be formed in a relatively simple process. However, since the roll printing technique is a type of contact printing technique, a printing plate surface may be easily contaminated during printing, and a new printing plate should be used for adjusting a line width. Therefore, the roll printing technique is not suitable for small quantity batch production.

Further, for clear stereoscopic images, an optical filter pattern should have the same line width as a pixel of the display device. However, according to an optical filter manufactured by using a typical method, it is difficult to correctly match the pixels of the display device and the optical filter pattern. Further, as illustrated in FIG. 1, a liquid crystal layer disposed on an alignment layer flows down along a side of the alignment layer, and thus, the liquid crystal layer becomes thinner and is mixed with an adjacent liquid crystal layer. Therefore, the liquid crystal layer cannot contact the alignment layer, thereby generating a non-aligned portion and limiting the realization of high-quality stereoscopic images.

DETAILED DESCRIPTION OF INVENTION

Technical Problem

An aspect of the present invention provides an optical filter for a stereoscopic display device separating left-view and right-view images, and a stereoscopic display device including the same, wherein a width of a patterned line and a thickness of a liquid crystal layer in the optical filter are easily adjustable, manufacturing processes of the optical filter are simple, and optical characteristics thereof are excellent.

Technical Solution

According to an aspect of the present invention, there is provided an optical filter for a stereoscopic display device separating left-view and right-view images, the optical filter including a substrate, an alignment layer formed on the substrate in a predetermined pattern and having a partition wall part on an edge of the alignment layer, and a liquid crystal layer formed on the alignment layer, wherein a height of the partition wall part is two to ten times greater than a thickness of a center part of the alignment layer.

The height of the partition wall part may be three to seven times, or five to six times greater than the thickness of the center part of the alignment layer.

The thickness of the center part of the alignment layer may be 20 nm to 500 nm.

The alignment layer may be composed of an alignment layer forming composition including 1 wt % to 5 wt % of a norbornene monomer substituted with fluorine or a cinnamate group, 1 wt % to 6 wt % of an acrylate monomer, 0.1 wt % to 2 wt % of a photoinitiator; and a solvent for the remainder.

A boiling point of the alignment layer forming composition may be 130° C. to 180° C., and viscosity of the alignment layer forming composition may be 4 cp to 20 cp.

The alignment layer forming composition may lose weight by 1 wt % to 40 wt %, 2 wt % to 20 wt %, or 4 wt % to 10 wt % after being dried for three minutes at a temperature of 50° C. to 150° C.

According to another aspect of the present invention, there is provided a stereoscopic display device including the optical filter.

According to another aspect of the present invention, there is provided a method for manufacturing an optical filter for a stereoscopic display device separating left-view and right-view images, the method including the steps of: (a) forming an alignment layer in a predetermined pattern by printing an alignment layer forming composition on a substrate, and then by drying the printed alignment layer forming composition, wherein a partition wall part is formed on an edge of the alignment layer; and (b) forming a liquid crystal layer on the alignment layer.

Further, the drying may be performed for one to five minutes at temperature of 50° C. to 150° C.

Effects of Invention

According to an optical filter of the present invention, a partition wall part is formed on an edge of an alignment layer so that a liquid crystal layer does not flow down along the sides of the alignment layer. Therefore, a line width of a pattern is not increased, and a non-aligned portion due to mixed liquid crystal layers is not formed, thereby improving optical performance. Further, the liquid crystal layer is prevented from becoming thinner by the partition wall part, and thus, a desired retardation value can be obtained. Moreover, since the optical filter according to the present invention is manufactured by using an inkjet method, a kind of a non-contact printing method, surface contamination does not occur and a line width may be freely adjusted.

Figure 1:
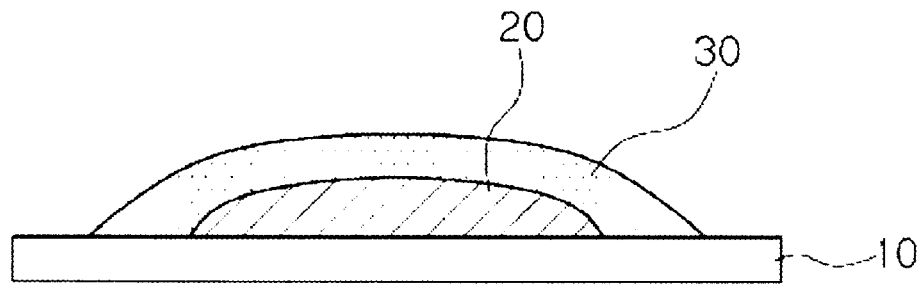
FIG. 1 is a diagram illustrating shapes of an alignment layer and a liquid crystal layer formed according to the related art.

DESCRIPTION WITH REGARD TO REFERENCE NUMERALS 10, 110, 210, 310, 410: a substrate
20, 120, 220, 320, 420: an alignment layer
126, 226, 326, 426: a partition wall part
128, 228, 328, 428: a center part
30, 130, 230, 330, 430: a liquid crystal layer

BEST MODE FOR INVENTION

Exemplary embodiments of the present invention will now be described in detail with reference to the accompanying drawings.

Figure 2:
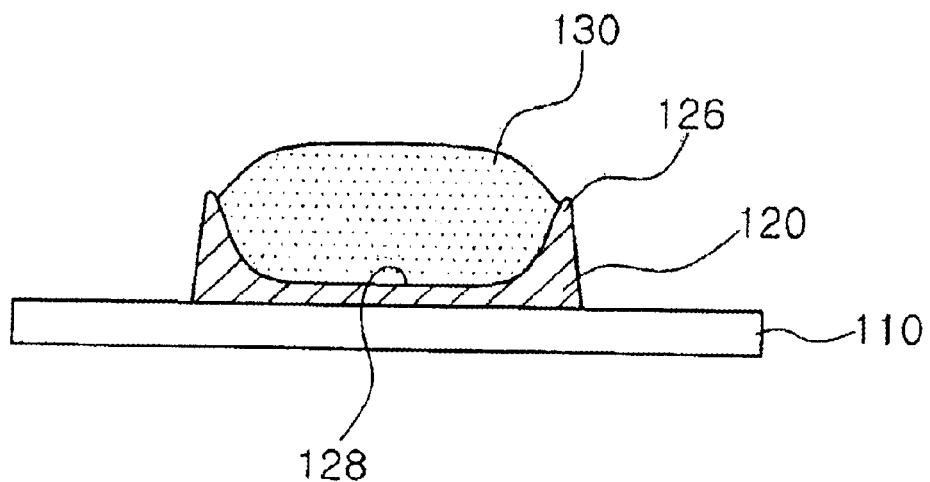
FIG. 2 is a diagram illustrating an alignment layer and a liquid crystal layer according to an embodiment of the present invention.

FIG. 2 illustrates a structure of an optical filter for a stereoscopic display, which separates a left-view image and a right-view image, according to an aspect of the present invention. As illustrated in FIG. 2, the optical filter for a stereoscopic display device according to an aspect of the present invention includes a substrate 110, an alignment layer 120, and a liquid crystal layer 130.

According to the present invention, the substrate 110 is not limited to a particular substrate, and thus, any transparent substrate having excellent light transmissivity may be used for the substrate 110. For instance, various plastic films such as cycloolefin copolymer (COC), cycloolefin polymer (COP), triacethyl cellulose (TAC), and acrylate films may be used.

The alignment layer 120 is formed in a predetermined pattern on the substrate 110, and a partition wall part 126 is formed on edges of the alignment layer 120. In general, according to the related art, the alignment layer for the optical filter is shaped as illustrated in FIG. 1. In this case, when a liquid crystal layer 30 is formed on an alignment layer 20, the liquid crystal layer 30 flows down to cover the sides thereof. If the liquid crystal layer flows down along the sides of the alignment layer, the liquid crystal layer becomes thinner, causing an insufficient retardation value. Further, since a line width of a pattern is increased, a pattern may be mixed with an adjacent pattern, and thus, alignment is not appropriately achieved. Therefore, optical performance is degraded, and quality of stereoscopic images is also degraded.

The inventors have repeatedly conducted research and have found that the liquid crystal layer is prevented from flowing down along the sides of the alignment layer by forming the partition wall part on edges of the alignment layer, and thus the above-described problems are solved.

A height of the partition wall part 126 may be two to ten times, three to seven times, or five to six times greater than a thickness of a center part 128 of the alignment layer 120.

When the height of the partition wall part 126 is less than a double thickness of the center part 128 of the alignment layer 120, the height of the partition wall part 126 is too low in comparison with the center part, and thus, the liquid crystal layer on the partition wall part 126 may not have a sufficient thickness. When the height of the partition wall part 126 is greater than a decuple thickness of the center part 128, the partition wall part 126 is too high, thereby having an increased width. Thus, a portion of the partition wall part 126 on which the liquid crystal layer 130 is not formed is increased, causing degradation of optical characteristics.

In detail, a thickness of the center part 128 of the alignment layer 120 may be 20 nm to 500 nm. This is because alignment may not be achieved if the center part 128 is too thin, and aligning ability is degraded and materials are unnecessarily wasted when the thickness of the center part 128 is too thick.

More specifically, in a case in which the thickness of the center part 128 is 30 nm to 300 nm, alignment characteristics of liquid crystals are improved. In a case in which the thickness of the center part 128 is 50 nm to 200 nm, the alignment characteristics of liquid crystals are improved and a margin of an inkjet process is optimized, and thus, a linear pattern may be more easily formed. Herein, the optimization of the inkjet process margin means that ink is jetted to precise positions according to the inkjet method due to the shape generated by the thickness difference between the partition wall part 126 and the center part 128 of the alignment layer.

Corresponding to the thickness of the center part 128, the height of the partition wall part 126 may be 40 nm to 5000 nm, 60 nm to 3000 nm, or 100 nm to 2000 nm.

Meanwhile, the alignment layer 120 may be formed of a composition containing a norbornene monomer; an acrylate monomer; a photoinitiator; and a solvent for the remainder.

Herein, the norbornene monomer is used as an optical alignment material, and may be substituted with a fluorine or a cinnamate group. This is because the fluorine or the cinnamate group contained in the norbornene gives polarity to an optical alignment polymer material to thereby help liquid crystals to be aligned. The norbornene monomer content may be 1 wt % to 5 wt %, or more specifically, 2 wt % to 4 wt %. In a case in which the norbornene monomer content is less than 1 wt %, the liquid crystals may not be properly aligned. In a case in which the norbornene monomer content is higher than 5 wt %, adhesive strength with regard to a substrate may be insufficient.

Meanwhile, the acrylate monomer is used as a cross-linking agent, and the acrylate monomer content may be 1 wt % to 6 wt %, or more specifically, 2 wt % to 4 wt %. In a case in which the acrylate monomer content is less than 1 wt %, a layer may not be sufficiently hardened. In a case in which the acrylate monomer content is higher than 6 wt %, liquid crystal alignment performance may be degraded.

Meanwhile, Irgacure 365 or Irgacure 907 may be used as the photoinitiator, and the photoinitiator content may be 0.1 wt % to 2 wt %. In a case in which the photoinitiator content is less than 0.1 wt %, a photochemical reaction may not be sufficient, causing a degradation of a polymerization degree of the cross-linking agent. In a case in which the photoinitiator content is higher than 2 wt %, manufacturing costs are merely increased without an improvement in the degree of cross-linking.

Meanwhile, the solvent is not particularly limited, and thus, any solvent allowing the alignment layer forming composition to boil at a temperature of 130° C. to 180° C. may be used. For instance, aromatic solvents such as toluene and xylene, cyclopentanone, and cyclohexanone may be used, taken alone or in combination. Further, the solvent is included such that the overall composition content becomes 100 wt %. In detail, the solvent content may be 87 wt % to 97.9 wt %.

Further, additives such as a viscosity agent, a cross-linking agent, a photoinitiator, and a surfactant may be additionally added to the alignment layer forming composition within the scope of not degrading material properties.

Further, the alignment layer forming composition may have a low boiling point of about 130° C. to about 180° C., or more specifically, 150° C. to 180° C. In the case of using the low boiling point composition, edge parts of the alignment layer are more rapidly dried than the center part after a printing process. Therefore, solids are concentrated on the edge parts, and thus, the edge parts become thicker, thereby forming the partition wall. Herein, a height and a thickness of the partition wall are influenced by a drying rate. In a case in which the boiling point is higher than 180° C., since the drying rate is too low, the partition wall is barely formed. Therefore, for forming the partition wall on the edges of the alignment layer, the boiling point of the alignment layer forming composition may be low. However, in a case in which the boiling point is less than 130° C., the drying rate is too fast. Therefore, even the ink on an inkjet nozzle is dried, and thus, it is difficult for the inkjet process to be stably performed.

Further, the viscosity of the alignment layer forming composition may be about 4 cp to about 20 cp, or more specifically, about 8 cp to about 15 cp. However, the viscosity is not limited thereto. In a case in which the viscosity of the alignment layer forming composition is less than 4 cp, ink jetting is not stable during the inkjet printing process. Therefore, a satellite is generated, and linearity is degraded, thereby making it difficult to form a pattern. In a case in which the viscosity is higher than 20 cp, the printing nozzle may be blocked. Meanwhile, in a case in which the viscosity of the alignment layer forming composition is between 8 cp and 15 cp, a stable jetting condition may be continuously maintained during the performing of the inkjet process.

Further, the alignment layer forming composition may be dried, such that it loses weight by as much as 1 wt % to 40 wt % after being dried for three minutes at a temperature of 50° C. to 150° C. In a case in which the weight lost after a three-minute drying period is less than 1 wt %, the partition wall is not properly formed. In a case in which the weight lost after three-minute drying is greater than 40 wt %, the partition wall is not uniformly formed, thereby greatly degrading pattern linearity. As a prerequisite for drying the alignment layer forming composition, 10 g of the alignment layer forming composition is put into a glass dish, which has a diameter of 90 mm, to a thickness of about 4 mm, and is mounted on a heating plate installed in an exhaust hood of a laboratory. Meanwhile, in general, the drying rate is influenced by the boiling point of the alignment layer forming composition and the drying temperature. Therefore, the boiling point and the drying temperature may be adjusted so that the alignment layer forming composition has the above-described drying rate.

Further, more specifically, the alignment layer forming composition may be such dried that it loses weight by as much as 2 wt % to 20 wt %, or further more specifically, 4 wt % to 10 wt % after being dried for three minutes at a temperature of 50° C. to 150° C. This is because it is suitable for the edges of the alignment layer to have a thickness which is three to seven times, or five to six times greater than that of the center part of the alignment layer in the case of the above-described scope of lost weight during the drying process at the above-described temperature.

Meanwhile, the alignment layer is formed in a predetermined pattern, e.g., a stripe pattern or a grid pattern. The alignment layer pattern may correspond to pixels of a display panel. Further, a line width of the alignment layer may be the same as a pixel width of the display panel in order to more correctly match the alignment layer with the display panel.

The alignment layer patterned as described above may be formed by using the inkjet printing method. Since the inkjet printing method is a kind of a non-contact printing method, surface contamination is reduced during the printing, and a line width may be variously adjusted by changing a position of the inkjet nozzle. Therefore, the inkjet printing method is suitable for small quantity batch production. Further, since the alignment layer may be formed only on desired positions, waste of materials is prevented and manufacturing costs are low. For forming the alignment layer by using the inkjet printing, e.g., the alignment layer forming composition is provided to an inkjet printer, and then, alignment layers for a left-view or right-view image are printed at regularly spaced intervals by using the charged composition. Then, the alignment layers are dried and aligned. Further, according to need, the aligning layer forming composition may be secondarily printed on a region where the alignment layer is not formed, and then, may be dried and aligned. Herein, the alignment process may be performed according to a rubbing alignment method or a photo alignment method. In the case of forming the aligning layer in two stages, the firstly formed alignment layer and the secondarily formed alignment layer may be aligned in different directions, more specifically, in directions perpendicular to each other. In this case, polarizing directions caused by the alignment of liquid crystals become exactly perpendicular to each other. Therefore, crosstalk between left-view and right-view images may be minimized.

Further, the drying process may be performed at a low temperature of 50° C. to 150° C., or more specifically, 80° C. to 100° C. When the drying temperature is less than 50° C., drying may not be properly completed. When the drying temperature is higher than 150° C., the substrate film may be damaged.

When the alignment layer 120 having the partition wall part 126 on the edges thereof is formed under the above-described conditions, the liquid crystal layer 130 is formed on the alignment layer 120. The liquid crystal layer 130 is for generating retardation. The retardation value is influenced by a thickness of the liquid crystal layer 130. Therefore, it is important to maintain the thickness of the liquid crystal layer 130. Although the thickness of the liquid crystal layer 130 may be changed according to the retardation value desired and materials of the liquid crystal layer, the thickness may be 1 μm to 4 μm, more specifically, 1 μm to 3 μm, or even more specifically, 1 μm to 2 μm. In a case in which the thickness of the liquid crystal layer is less than 1 μm, a travelling distance of light passing through the liquid crystal layer is reduced, and thus, polarizing characteristics for realizing an optical filter are not sufficiently exhibited. In a case in which the thickness of the liquid crystal layer is greater than 4 μm, liquid crystals are not uniformly aligned up to an upper portion of the liquid crystal layer.

According to the present invention, the liquid crystal layer 130 is supported by the partition wall part 126 of the alignment layer 120 so as to be stably formed on the alignment layer 120 without flowing down along the sides of the alignment layer 120. Therefore, the liquid crystal layer 130 may be prevented from becoming thinner. Moreover, since the liquid crystal layer 130 is correctly formed on the alignment layer 120, a line width of a pattern may be prevented from being increased. As described above, according to the optical filter of the present invention, the pattern line width and the thickness of the liquid crystal layer are stably maintained. Therefore, the degradation of optical performance due to an increase in line width and a decrease in the thickness of the liquid crystal layer is prevented, thereby exhibiting excellent optical characteristics.

Meanwhile, the liquid crystal layer 130 may be formed by using the inkjet printing method, like the alignment layer 120. The inkjet printing method provides precise printing adjustment. Therefore, by using the inkjet printing method for forming the liquid crystal layer, the thickness of the liquid crystal layer may be precisely adjusted. In detail, for forming the liquid crystal layer 130, the liquid crystal layer forming composition may be provided to the inkjet printer. Then, the liquid crystal layer forming composition may be applied onto the alignment layer through the inkjet nozzle, and then may be dried.

Herein, the liquid crystal layer forming composition may include a reactive liquid crystal monomer and a solvent. The reactive liquid crystal monomer is a composition which is combined with adjacent monomers by light or heat to be polymerized. For instance, one or more monomers combined with an acrylate group, a reactor inducing polymerization, may be used. More specifically, commercially available Reactive Mesogen (RM) from the Merck Company or LC242 from the BASF Company may be used. Meanwhile, although the solvent may be changed according to the liquid crystal layer forming composition used, aromatic solvents such as toluene and xylene and an acetate-based solvent such as propylene glycol methyl ether acetate (PGMEA) may be used, taken alone or in combination. Further, additives such as a viscosity agent, a cross-linking agent, a photoinitiator, and a surfactant may be additionally added to the liquid crystal layer forming composition within the scope of not degrading material properties.

Further, the viscosity of the liquid crystal layer forming composition may be about 4 cp to about 20 cp, or more specifically, about 8 cp to about 15 cp. However, the viscosity is not limited thereto. In a case in which the viscosity of the liquid crystal layer forming composition is less than 4 cp, ink jetting is not stable during the inkjet printing process. Therefore, a satellite is generated, and linearity is degraded, thereby making it difficult to form a pattern. In a case in which the viscosity is higher than 20 cp, the printing nozzle may be blocked. Meanwhile, in a case in which the viscosity of the liquid crystal layer forming composition is between 8 cp and 15 cp, a stable jetting condition may be continuously maintained during performing the inkjet process.

Further, the boiling point of the liquid crystal layer forming composition may be about 130° C. to about 200° C. However, the boiling point is not limited thereto. In a case in which the boiling point is less than 130° C., the drying rate may be too rapid during the jetting of the composition, and thus, the nozzle may be blocked. In a case in which the boiling point is higher than 200° C., the drying may not be properly completed.

Meanwhile, the liquid crystal layer forming composition may be dried at a low temperature of 50° C. to 150° C. after being applied. When the drying temperature is less than 50° C., the drying may not be properly completed. When the drying temperature is higher than 150° C., the substrate film may be damaged. Further, the drying may be performed for about one to about five minutes.

Figure 3:
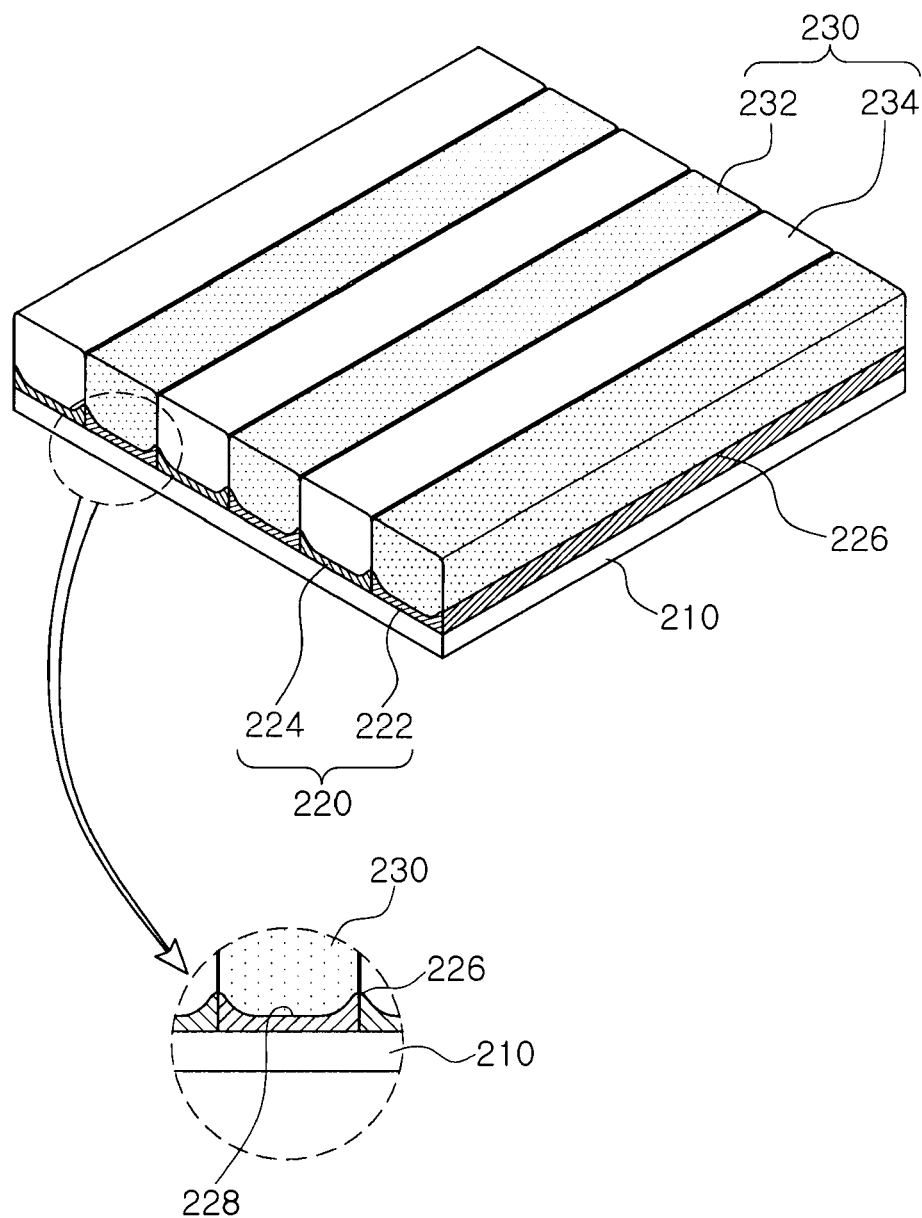
FIG. 3 is a diagram illustrating an optical filter for a stereoscopic display device according to an embodiment of the present invention.
Figure 4:
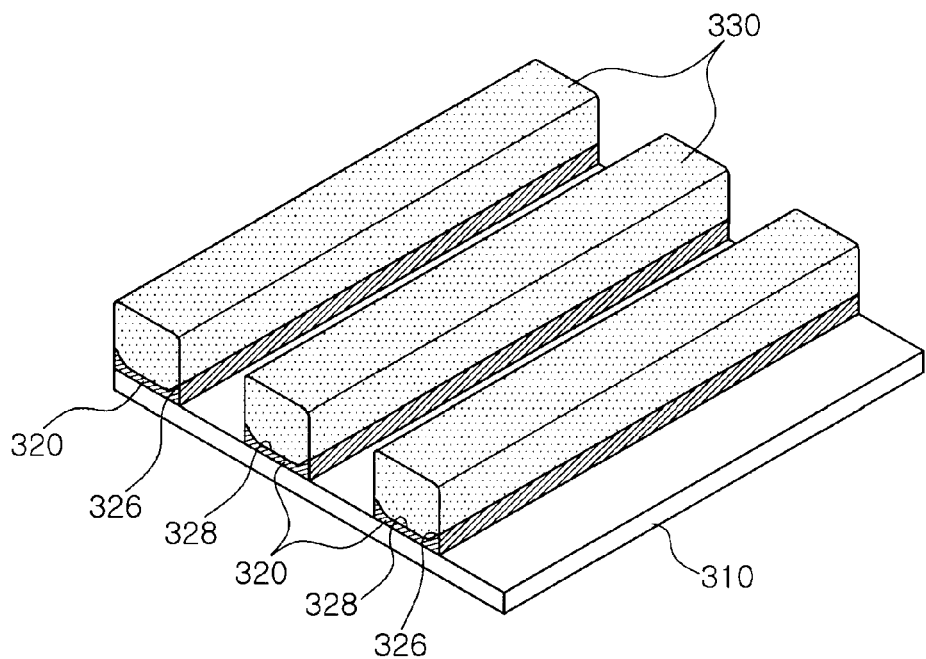
FIG. 4 is a diagram illustrating an optical filter for a stereoscopic display device according to another embodiment of the present invention.
Figure 5:
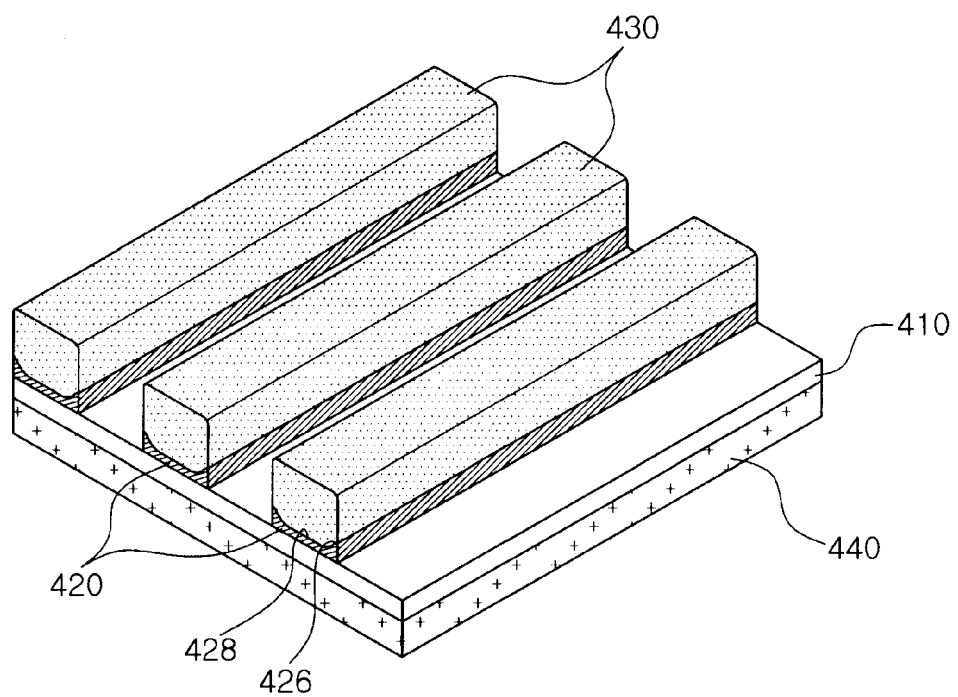
FIG. 5 is a diagram illustrating an optical filter for a stereoscopic display device according to still another embodiment of the present invention.

FIGS. 3 to 5 illustrate various embodiments of an optical filter for a stereoscopic display device, according to an aspect of the present invention.

According to an embodiment, as illustrated in FIG. 3, alignment layers 222 and 224 having different alignment directions may be alternately formed on a substrate 210, and a liquid crystal layer 230 may be formed on the alignment layers, to thereby form the optical filter. Herein, the alignment directions of the alignment layers 222 and 224 may be perpendicular to each other. Each of the alignment layers 222 and 224 includes a partition wall part 226 a height of which is higher than that of a center part 228. Meanwhile, the liquid crystal layer 230 is aligned according to the alignment directions of the lower alignment layers 222 and 224, and thus has different alignment directions. Herein, liquid crystal layers 232 and 234 having different alignment directions may have retardation values of $\lambda/4$ and $-\lambda/4$. By using the optical filter patterned with the $\lambda/4$-retardation layer and $-\lambda/4$-retardation layer, difference polarizing states may be given to the left-view and right-view images of the display panel, thereby effectively realizing stereoscopic images.

According to another embodiment, as illustrated in FIG. 4, an alignment layer 320 and a liquid crystal layer 330 may only be partially formed on a substrate 310, to thereby form the optical filter. In this case, the optical filter of FIG. 4 is similar to that of FIG. 3 in that a partition wall part 326 is formed on the edges of the alignment layer 320, and the liquid crystal layer 330 is formed within the partition wall part 326. However, in the case of selectively forming the retardation layer on a partial region, as illustrated in FIG. 4, a retardation value of the liquid crystal layer may be $\lambda/2$. In this case, only one of the left-view and right-view images passes through the retardation layer, and a retardation value of the image which has passed through the retardation layer is delayed by $\lambda/2$. As a result, the left-view and right-view images are polarized to be perpendicular to each other, and thus, stereoscopic images may be realized.

According to still another embodiment, as illustrated in FIG. 5, an alignment layer 420 and a liquid crystal layer 430 are formed on a partial region of one side of a substrate 410, and a retardation plate 440 is attached to the other side of the substrate 410, to thereby form the optical filter. In this case, the liquid crystal layer 430 may have a retardation value of $\lambda/2$ like the liquid crystal layer of FIG. 4, and the retardation plate 440 attached to the other side of the substrate 410 may be a $\lambda/4$-retardation plate. Herein, the $\lambda/4$-retardation plate may be formed by coating one side of the substrate with an alignment layer and a liquid crystal layer or by attaching a $\lambda/4$-retardation plate composed of polymer materials to the one side of the substrate.

According to the optical filter for a stereoscopic display device having the above-described structure, a retardation value of one of the left-view and right-view images is delayed by $\lambda/2$ while passing through the $\lambda/2$-retardation layer constituted of the liquid crystal layer. An image which has not passed through the liquid crystal layer has an original phase. Therefore, the left-view and right-view images are polarized to be perpendicular to each other, and are then circularly polarized with opposite rotation directions while passing through the $\lambda/4$-retardation layer.

Meanwhile, a method for manufacturing an optical filter for a stereoscopic display device separating left-view and right-view images, according to another aspect of the present invention, includes the steps of (a), forming an alignment layer; and (b), forming a liquid crystal layer.

In the step of (a), forming the alignment layer, an alignment layer forming composition is printed on a substrate, and then is dried to be formed in a predetermined pattern and have a partition wall part on an edge of the alignment layer.

Meanwhile, the alignment layer is formed by printing a composition containing a norbornene monomer; an acrylate monomer; a photoinitiator; and a solvent for the remainder in a predetermined pattern and then by drying the printed composition.

For the alignment layer forming composition, the norbornene monomer may be substituted with fluorine or a cinnamate group, and the norbornene monomer content in the alignment layer forming composition may be 1 wt % to 5 wt %. Further, the acrylate monomer is used as a cross-linking agent, and the acrylate monomer content may be 1 wt % to 6 wt %. Further, Irgacure 306 or Irgacure 907 may be used as the photoinitiator, and the photoinitiator content may be 0.1 wt % to 2 wt %. Further, the solvent is not particularly limited, and thus, any solvent allowing the alignment layer composition to boil at a temperature of 130° C. to 180° C. may be used. For instance, aromatic solvents such as toluene and xylene, cyclopentanone, and cyclohexanone may be used, taken alone or in combination. Further, the solvent is included so that the whole composition content becomes 100 wt %. In detail, the solvent content may be 87 wt % to 97.9 wt %.

The printing may be performed by using the inkjet printing method. Since the inkjet printing method is a kind of a non-contact printing method, surface contamination is reduced during the printing, and a line width may be variously adjusted by changing a position of the inkjet nozzle. Therefore, the inkjet printing method is suitable for small quantity batch production. Further, since the alignment layer may be formed only on desired positions, waste of materials is prevented and manufacturing cost is low.

Further, the drying process may be performed at a low temperature of 50° C. to 150° C., more specifically, 80° C. to 100° C. When the drying temperature is less than 50° C., drying may not be properly completed. When the drying temperature is higher than 150° C., the substrate film may be damaged.

Meanwhile, the predetermined pattern may be, e.g., a stripe pattern or a grid pattern.

Meanwhile, a height of the partition wall part may be two to ten times, three to seven times, or five to six times greater than a thickness of a center part of the alignment layer. When the height of the partition wall part is less than a double thickness of the center part of the alignment layer, the height of the partition wall part is too low in comparison with the center part, and thus, the liquid crystal layer on the partition wall part may not have a sufficient thickness. When the height of the partition wall part is greater than a decuple thickness of the center part, the partition wall part is too high, thereby having an increased width. Thus, a portion of the partition wall part, on which the liquid crystal layer is not formed, is increased, causing degradation of optical characteristics.

Next, in the step of (b), forming the liquid crystal layer, the liquid crystal layer is formed on the alignment layer. The liquid crystal layer is for generating retardation. Since the retardation value is influenced by a thickness of the liquid crystal layer, the liquid crystal layer may need to be uniformly formed. The thickness may be 1 μm to 4 μm.

Meanwhile, the liquid crystal layer may be formed by using the inkjet printing method like the alignment layer. The inkjet printing method provides precise adjustment of printing. Therefore, by using the inkjet printing method, the thickness of the liquid crystal layer may be precisely adjusted.

Mode for Invention

Hereinafter, the present invention will be described in detail with reference to detailed embodiments.

Embodiment 1

4 wt % of a norbornene monomer side-substituted with a cinnamate group and fluorine, 4 wt % of pentaerythritol triacrylate (PETA), and 0.5 wt % of a photoinitiator (Irgacure 907) were dissolved in 91.5 wt % of cyclohexanone to prepare an alignment layer forming composition. Viscosity and boiling point of the alignment layer forming composition were 7.4 cp and 157° C. respectively.

Figure 6:
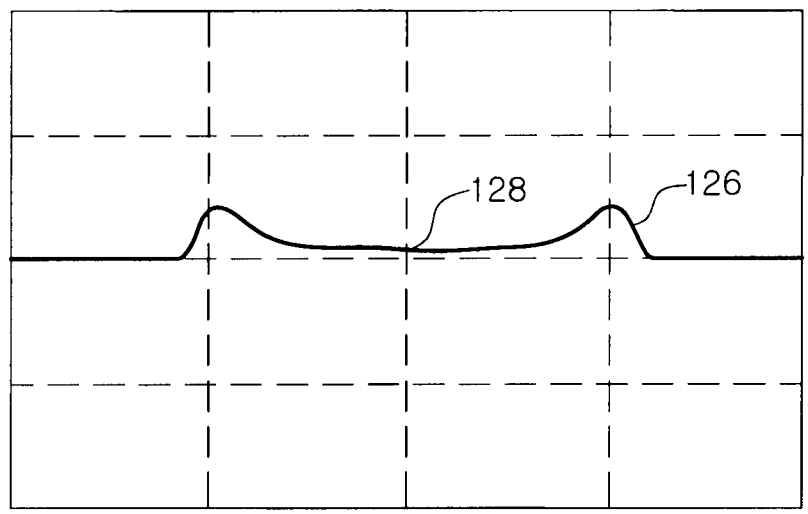
FIG. 6 is a diagram illustrating a shape of an alignment layer of Embodiment 1 of the present invention.

The alignment layer forming composition was provided to an inkjet printer, and then was printed in a stripe form having a line width of 350 μm and a line distance of 400 μm. Then, the printed composition was dried for two minutes at a temperature of 80° C., and a wire grid polarizing plate was mounted at an angle of 45° to be irradiated with ultraviolet (UV) rays, to thereby form an alignment layer. FIG. 6 illustrates a shape of the above-described alignment layer, which was measured by using an optical measurement device (equipment name: non-contact 3D profiler, manufacturer: Nano System). In FIG. 6, the x-axis denotes a cross section of the formed pattern, and the y-axis denotes a height thereof.

Next, a liquid crystal layer forming composition prepared by dissolving 25 wt % of RMM 108 (manufactured by Merck Company) in polyethylene glycol methyl ether acetate (PGMEA) and ethyl carbitol acetate (ECA) was printed by using the inkjet printing method to thereby form a liquid crystal layer. Viscosity and boiling point of the liquid crystal layer forming composition were 4.8 cp and 182° C. respectively.

Figure 7:
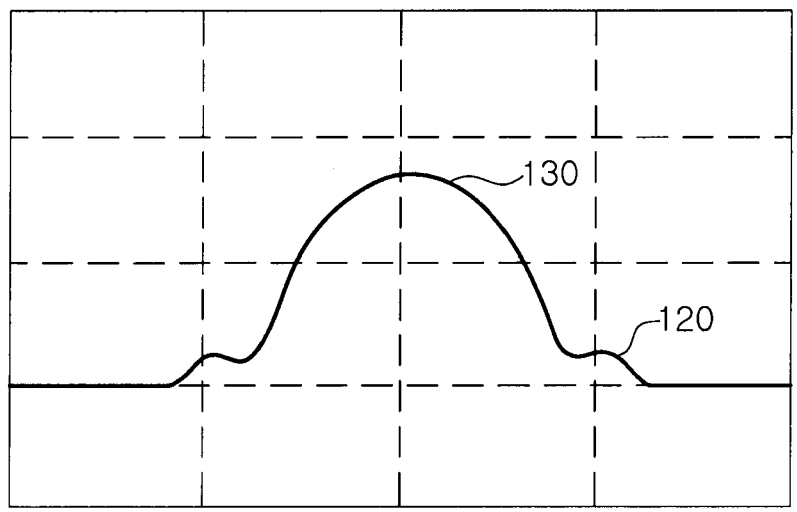
FIG. 7 is a diagram illustrating shapes of an alignment layer and a liquid crystal layer of Embodiment 1 of the present invention.

A drop pitch for patterning was 100 μm, and the liquid crystal layer forming composition was jetted between partition wall parts of the alignment layer to be correctly disposed on the alignment layer. The composition was dried in an oven for two minutes at a temperature of 60° C., and was irradiated with UV rays to harden liquid crystals thereof. FIG. 7 illustrates a shape of the above-described liquid crystal layer, which was measured by using the optical measurement device (equipment name: non-contact 3D profiler, manufacturer: Nano System). In FIG. 7, the x-axis denotes a cross section of the formed pattern, and the y-axis denotes a height thereof.

Embodiment 2

An alignment layer was formed by using the same method as in Embodiment 1 except that diisobutylketone was used as a solvent of the alignment layer forming composition and the viscosity and boiling point were 12.1 cp and 169° C. respectively. Next, a liquid crystal layer was formed by using the same method as in Embodiment 1.

Embodiment 3

4 wt % of a norbornene monomer side-substituted with a cinnamate group and fluorine, 2 wt % of pentaerythritol triacrylate (PETA), and 0.5 wt % of a photoinitiator (Irgacure 907) were dissolved in 93.5 wt % of a solvent in which cyclohexanone and cyclopentanone were mixed with each other at a ratio of 1:1 to prepare an alignment layer forming composition. Viscosity and boiling point of the alignment layer forming composition were 7.2 cp and 143.5° C. respectively. An alignment layer was formed by using this alignment layer forming composition in the same manner as described above in Embodiment 1. Next, a liquid crystal layer was formed by using the same method as in Embodiment 1.

COMPARATIVE EXAMPLE 1

4 wt % of a norbornene monomer side-substituted with a cinnamate group and fluorine, 4 wt % of pentaerythritol triacrylate (PETA), and 0.5 wt % of a photoinitiator (Irgacure 907) were dissolved in 91.5 wt % of a solvent in which cyclohexanone and ethyl carbitol acetate were mixed with each other at a ratio of 1:1 to prepare an alignment layer forming composition. Viscosity and boiling point of the alignment layer forming composition were 10.1 cp and 187° C. respectively.

Figure 8:
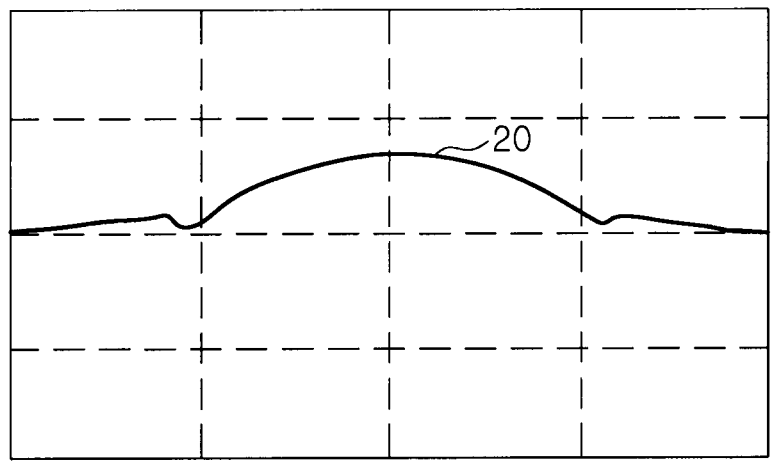
FIG. 8 is a diagram illustrating a shape of an alignment layer of Comparative Example 1 of the present invention.

The alignment layer forming composition was provided to an inkjet printer, and then was printed in a stripe form having a line width of 350 μm and a line distance of 400 μm. Then, the printed composition was dried for at least one hour at a temperature of 40° C., to thereby form an alignment layer. FIG. 8 illustrates a shape of the above-described alignment layer, which was measured by using the optical measurement device (equipment name: non-contact 3D profiler, manufacturer: Nano System). In FIG. 8, the x-axis denotes a cross section of the formed pattern, and the y-axis denotes a height thereof. Referring to FIG. 8, it may be determined that a partition wall part is barely formed on the alignment layer according to Comparative Example 1.

Next, a liquid crystal composition prepared by dissolving 25 wt % of RMM 108 (manufactured by Merck Company) in polyethylene glycol methyl ether acetate (PGMEA) and ethyl carbitol acetate (ECA) was printed by using the inkjet printing method to thereby form a liquid crystal layer. Viscosity and boiling point of the liquid crystal layer forming composition were 4.8 cp and 182° C. respectively.

Figure 9:
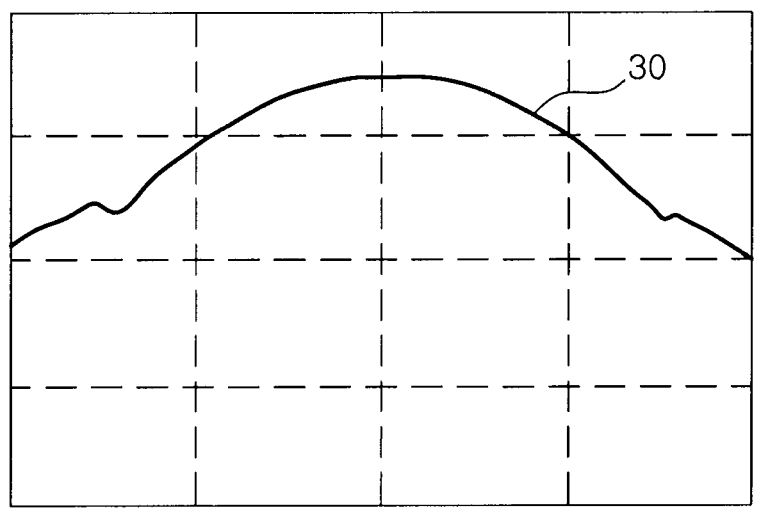
FIG. 9 is a diagram illustrating shapes of an alignment layer and a liquid crystal layer of Comparative Example 1 of the present invention.

A drop pitch for patterning was 100 μm, and the liquid crystal layer forming composition was jet between partition wall parts of the alignment layer to be correctly disposed on the alignment layer. The composition was dried in an oven for two minutes at a temperature of 60° C., and was irradiated with UV rays to harden liquid crystals thereof. FIG. 9 illustrates a shape of the above-described liquid crystal layer, which was measured by using the optical measurement device (equipment name: non-contact 3D profiler, manufacturer: Nano System). In FIG. 9, the x-axis denotes a cross section of the formed pattern, and the y-axis denotes a height thereof. Referring to FIG. 9, it may be determined that the liquid crystal layer forming composition flows down along the sides of the alignment layer, and thus, the liquid crystal layer becomes thinner and a line width is increased in a case in which the alignment layer and the liquid crystal layer are formed according to Comparative Example 1.

COMPARATIVE EXAMPLE 2

Figure 10:
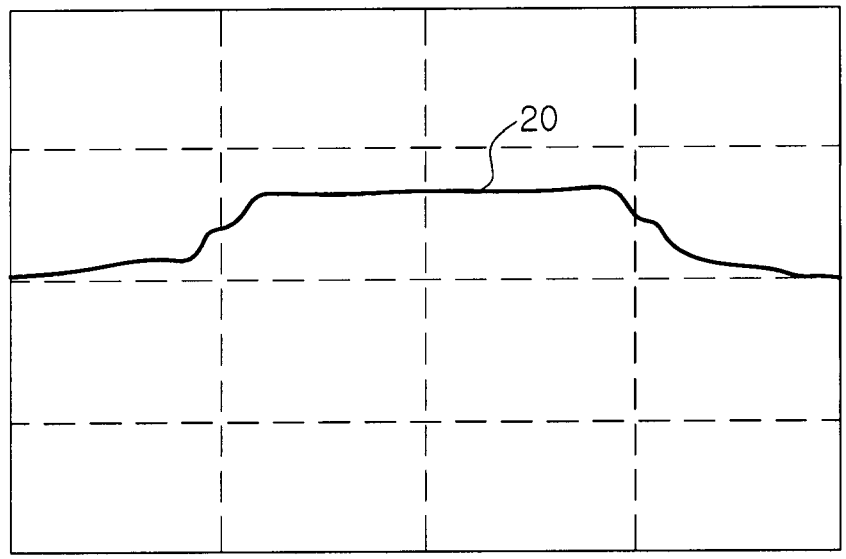
FIG. 10 is a diagram illustrating a shape of an alignment layer of Comparative Example 2 of the present invention.

An alignment layer was formed by using the same alignment layer forming composition as of Comparative Example 1 except that the composition was dried for an hour at a temperature of 60° C. FIG. 10 illustrates a shape of the above-described alignment layer, which was measured by using the optical measurement device (equipment name: non-contact 3D profiler, manufacturer: Nano System). In FIG. 10, the x-axis denotes a cross section of the formed pattern, and the y-axis denotes a height thereof. Referring to FIG. 10, it may be determined that a partition wall part is barely formed on the alignment layer, and thus, the alignment layer has a flat shape with similar thicknesses of a center part and edges thereof.

Figure 11:
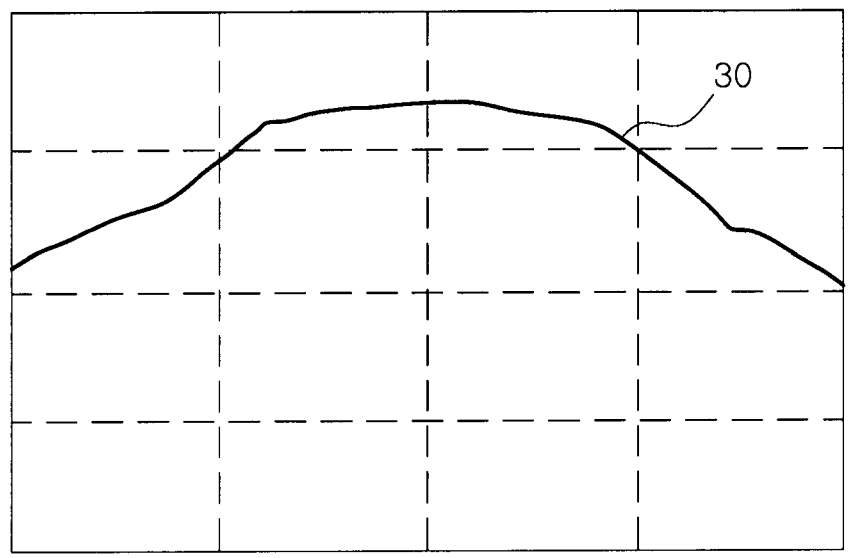
FIG. 11 is a diagram illustrating shapes of an alignment layer and a liquid crystal layer of Comparative Example 2 of the present invention.

Next, a liquid crystal layer was formed on the alignment layer by using the same method as in Comparative Example 1. FIG. 11 illustrates a shape of the above-described liquid crystal layer, which was measured by using the optical measurement device (equipment name: non-contact 3D profiler, manufacturer: Nano System). In FIG. 11, the x-axis denotes a cross section of the formed pattern, and the y-axis denotes a height thereof. Referring to FIG. 11, it may be determined that the liquid crystal layer forming composition flows onto the alignment layer, and thus, a line width is increased, uniformity of the line width is not good, and the liquid crystal layer becomes thinner in a case in which the alignment layer and the liquid crystal layer are formed according to Comparative Example 2.

COMPARATIVE EXAMPLE 3

4 wt % of a norbornene monomer side-substituted with a cinnamate group and fluorine, 4 wt % of pentaerythritol triacrylate (PETA), and 0.5 wt % of a photoinitiator (Irgacure 907) were dissolved in 91.5 wt % of cyclopentanone to prepare an alignment layer forming composition. Viscosity and boiling point of the alignment layer forming composition were 9.7 cp and 130° C. respectively. An alignment layer was formed by using the same method as in Comparative Example 1 except that the composition was rapidly dried for ninety seconds at a temperature of 150° C. after being printed.

Figure 12:
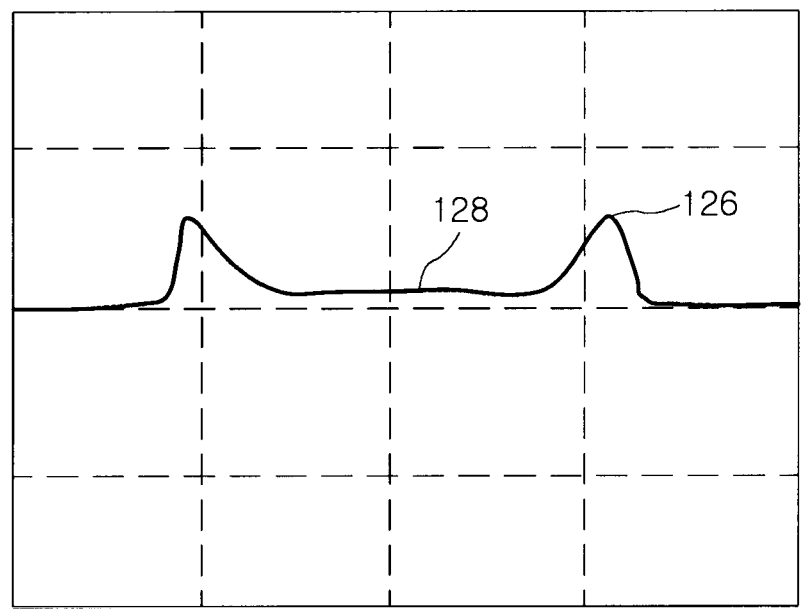
FIGS. 12 and 13 are diagrams illustrating shapes of an alignment layer of Comparative Example 3 of the present invention.
Figure 13:
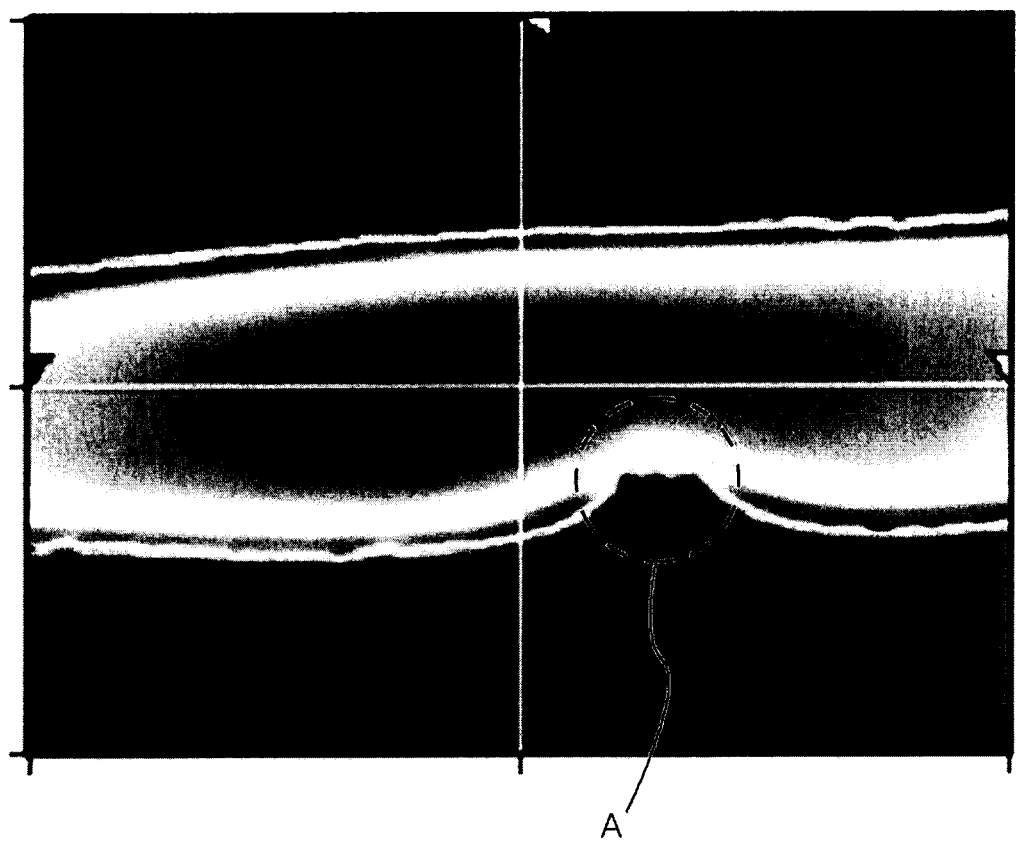

FIG. 12 illustrates a shape of the above-described alignment layer, which was measured by using the optical measurement device (equipment name: non-contact 3D profiler, manufacturer: Nano System). In FIG. 12, the x-axis denotes a cross section of the formed pattern, and the y-axis denotes a height thereof. Meanwhile, FIG. 13 illustrates a three-dimensional image of the alignment layer, which was measured by using an optical measurement device NS-M100. Referring to FIGS. 12 and 13, the alignment layer according to Comparative Example 3 has a portion in which heights of partition wall parts are not uniform (see portion A of FIG. 13). Accordingly, the uniformity of width and thickness of the alignment layer is much degraded in a line direction.

Next, forming a liquid crystal layer on the alignment layer by using the same method as in Comparative Example 1 was attempted. However, due to the lack of uniformity of the width and thickness of the alignment layer, the liquid crystal layer was not uniformly formed in a line direction, thereby degrading quality of the optical filter.

EXPERIMENTAL EXAMPLE 1

1. Measurement of Drying Rate 10 g of the alignment layer forming composition prepared according to each of Embodiments 1 to 3 and Comparative Examples 1 to 3 was put into a glass dish, which had a diameter of 90 mm, to a thickness of 4 mm, and the glass dish was mounted on a heating plate installed in an exhaust hood of a laboratory to be dried at a temperature specified by each Embodiment and Comparative Example. After three minutes and five minutes, weights of remaining alignment layer forming composition were measured. Results of the measurement are shown in Table 1 below. For reference, conditions other than composition and temperature were kept constant.

TABLE 1

| | Solvent | Drying temperature | Starting weight (g) | Weight after 3 minutes (g) | Weight after 5 minutes (g) | Drying rate (lost weight per 1-minute drying (wt %)) |
|---|---|---|---|---|---|---|
| Embodiment 1 | cyclohexanone | 80 | 10 | 9.475 | 8.98 | 5.25 |
| Embodiment 2 | diisobutylketone | 80 | 10 | 9.60 | 9.18 | 4.0 |
| Embodiment 3 | Cyclohexanone + cyclopentanone | 80 | 10 | 9.11 | 8.54 | 8.9 |
| Comparative Example 1 | Cyclohexanone + ethyl carbitol acetate | 50 | 10 | 9.96 | 9.92 | 0.4 |
| Comparative Example 2 | Cyclohexanone + ethyl carbitol acetate | 60 | 10 | 9.95 | 9.82 | 0.5 |
| Comparative Example 3 | cyclopentanone | 150 | 10 | 5.80 | 2.65 | 42 |

2. Measurement of Thicknesses of Center Part and Edges of Alignment Layer

Thicknesses of center parts and edges of the alignment layers according to Embodiments 1 to 3 and Comparative Examples 1 to 3 were measured by using the non-contact 3D profiler. Results of the measurement are shown in Table 2 below.

3. Measurement of Thickness and Pattern Line Width of Liquid Crystal Layer of Optical Filter Thicknesses and pattern line widths of the liquid crystal layers according to Embodiments 1 to 3 and Comparative Examples 1 to 3 were measured by using the non-contact 3D profiler. Results of the measurement are shown in Table 2 below.

TABLE 2

|  | Drying rate (lost weight per 1-minute drying (wt %)) | Alignment layer center part thickness (nm) | Alignment layer edge part thickness (nm) | Liquid crystal layer thickness (μm, including alignment layer thickness) | Pattern line width (μm) |
|---|---|---|---|---|---|
| Embodiment 1 | 5.25 | 80 | 400 | 3 | 350 |
| Embodiment 2 | 4.8 | 120 | 300 | 3.2 | 350 |
| Embodiment 3 | 8.9 | 60 | 420 | 2.8 | 350 |
| Comparative Example 1 | 0.4 | 270 | Unable to measure (edge part becomes thinner and has 0 thickness at the end) | 1.3 | 400 |
| Comparative Example 2 | 0.5 | 270 | 270 | 1.5 | 380 |
| Comparative Example 3 | 42 | 80 (large deviation according to portions) | 860 (large deviation according to portions) | Unable to form line pattern | Unable to form line pattern (width is not uniform) |

According to the results shown in Tables 1 and 2, the alignment layer forming compositions according to Embodiments 1 to 3 are reduced (dried) by about 4 wt % to about 10 wt % after being dried for three minutes. Due to these drying rates, a thickness of an edge of the alignment layer becomes two to ten times greater than that of a center part of the alignment layer. Therefore, the liquid crystal layer forming composition does not flow along the sides of the alignment layer. Accordingly, the line width of the pattern is maintained, and the thickness of the liquid crystal layer is prevented from being reduced. However, according to Comparative Examples 1 and 2, the reduced weight % after the three-minute drying are less than 1 wt %. Due to these drying rates, the partition wall part is barely formed. Meanwhile, according to Comparative Example 3, the reduced weight % after three-minute drying is about 42 wt %. Since the drying rate is too fast, the height of the partition wall part is not uniformly formed, and the linearity of the pattern is degraded.

The invention claimed is:

1. An optical filter for a stereoscopic display device separating left-view and right-view images, the optical filter comprising:
   a substrate;
   a plurality of alignment layers formed on the substrate in a predetermined pattern, each alignment layer having partition wall parts on edges of each alignment layer; and
   a liquid crystal layer formed on each of the alignment layers,
   wherein a height of each of the partition wall parts is two to ten times greater than a thickness of a center part of each of the alignment layers.

2. The optical filter of claim 1, wherein the height of each of the partition wall parts is three to seven times greater than the thickness of the center part of each of the alignment layers.

3. The optical filter of claim 1, wherein the height of each of the partition wall parts is five to six times greater than the thickness of the center part of each of the alignment layers.

4. The optical filter of claim 1, wherein the thickness of the center part of each of the alignment layers is 20 nm to 500 nm.

5. The optical filter of claim 1, wherein the plurality of alignment layers are composed of an alignment layer forming composition comprising 1 wt % to 5 wt % of a norbornene monomer which is substituted with fluorine or a cinnamate group; 1 wt % to 6 wt % of an acrylate monomer; 0.1 wt % to 2 wt % of a photoinitiator; and a remainder of a solvent.

6. The optical filter of claim 5, wherein a boiling point of the alignment layer forming composition is 130° C. to 180° C.

7. The optical filter of claim 5, wherein viscosity of the alignment layer forming composition is 4 cp to 20 cp.

8. The optical filter of claim 5, wherein the alignment layer forming composition loses weight by 1 wt % to 40 wt % after being dried for three minutes at a temperature of 50° C. to 150° C.

9. The optical filter of claim 5, wherein a boiling point of the alignment layer forming composition is 130° C. to 180° C., viscosity of the alignment layer forming composition is 4 cp to 20 cp, and the alignment layer forming composition loses weight by 1 wt % to 40 wt % after being dried for three minutes at a temperature of 50° C. to 150° C.

10. The optical filter of claim 7, wherein the plurality of alignment layers are formed by using an inkjet printing method.

11. The optical filter of claim 1, wherein a thickness of the liquid crystal layer is 1 μm to 2 μm.

12. A stereoscopic display device comprising the optical filter of claim 1.

13. A method for manufacturing an optical filter for a stereoscopic display device separating left-view and right-view images, the method comprising:
   (a) forming a plurality of alignment layers in a predetermined pattern by printing an alignment layer forming composition on a substrate, and then by drying the printed alignment layer forming composition, wherein partition wall parts are formed on edges of each of the plurality of alignment layers; and
   (b) forming a liquid crystal layer on each of the alignment layers,
   wherein a height of each of the partition wall parts is two to ten times greater than a thickness of a center part of each of the alignment layers.

14. The method of claim 13, wherein the drying is performed for one to five minutes at a temperature of 50° C. to 150° C.

* * * * *